US009141819B2

(12) United States Patent
Bade et al.

(10) Patent No.: US 9,141,819 B2
(45) Date of Patent: Sep. 22, 2015

(54) ENCRYPTED TAPE ACCESS CONTROL VIA CHALLENGE-RESPONSE PROTOCOL

(75) Inventors: Steven A. Bade, Georgetown, TX (US); John C. Dayka, New Paltz, NY (US); Glen Alan Jaquette, Tucson, AZ (US); Richard Henry Guski, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 1008 days.

(21) Appl. No.: 11/557,776

(22) Filed: Nov. 8, 2006

(65) Prior Publication Data

US 2008/0123863 A1    May 29, 2008

(51) Int. Cl.
*H04L 9/00*    (2006.01)
*G06F 21/62*    (2013.01)

(52) U.S. Cl.
CPC .... *G06F 21/6209* (2013.01); *G06F 2221/2107* (2013.01)

(58) Field of Classification Search
USPC ............... 713/182, 156, 160, 165, 185, 189; 726/26; 380/277
See application file for complete search history.

(56) References Cited

U.S. PATENT DOCUMENTS

| 4,203,166 | A |   | 5/1980 | Ehrsam et al. |
| 5,369,707 | A |   | 11/1994 | Follendore, III |
| 5,412,718 | A | * | 5/1995 | Narasimhalu et al. .......... 705/51 |
| 5,689,565 | A | * | 11/1997 | Spies et al. .................... 713/189 |
| 5,850,451 | A |   | 12/1998 | Sudia |
| 5,857,022 | A |   | 1/1999 | Sudia |
| 6,567,914 | B1 | * | 5/2003 | Just et al. ...................... 713/160 |
| 6,948,070 | B1 |   | 9/2005 | Ginter et al. |
| 2003/0196085 | A1 | * | 10/2003 | Lampson et al. ............. 713/156 |

(Continued)

FOREIGN PATENT DOCUMENTS

| JP | 10-126406 A | 5/1998 |
| JP | 2010126406 A | 5/1998 |

(Continued)

OTHER PUBLICATIONS

Webopedia, "public-key encryption" . . . downloaded on Jun. 26, 2006 from http://www.webopedia.com/TERM/P/public_key_cryptography.html.

(Continued)

*Primary Examiner* — Joseph P Hirl
*Assistant Examiner* — Sayed Beheshti Shirazi
(74) *Attorney, Agent, or Firm* — Robert H. Frantz; Parashos Kalaitzis

(57) ABSTRACT

Access to encrypted data on a removable computer media such as a computer tape is controlled via a uniquely-structured header on the medium having a symmetrical key wrapped by asymmetrical encryption plus a public key associated with the asymmetrical encryption. The data on the medium is encrypted using the symmetrical key. Prior to automated reading of the data by a reader, a challenge is issued to a host system including the public key and preferably a nonce value. The host responds by signing the nonce using a private key associated with the public key in order to prove it has rights to decrypt the data. The symmetrical key is unwrapped using the private key, and finally the unwrapped symmetrical key is used to decrypt the data on the medium, thereby allowing automated reading of the tape data without the need or risk of two administrators sharing a symmetrical key value.

12 Claims, 15 Drawing Sheets

(56) References Cited

U.S. PATENT DOCUMENTS

| | | | |
|---|---|---|---|
| 2005/0044045 A1* | 2/2005 | Pelly et al. ................. | 705/51 |
| 2006/0242068 A1* | 10/2006 | Jogand-Coulomb et al. ... | 705/50 |
| 2006/0262933 A1* | 11/2006 | Furukawa .................. | 380/281 |
| 2007/0028118 A1* | 2/2007 | Brown et al. ............... | 713/185 |
| 2007/0113078 A1* | 5/2007 | Witt et al. .................. | 713/165 |
| 2008/0069354 A1* | 3/2008 | Kitani et al. ............... | 380/202 |

FOREIGN PATENT DOCUMENTS

| | | |
|---|---|---|
| JP | 2005-252866 A | 9/2005 |
| JP | 2005252866 A | 9/2005 |

OTHER PUBLICATIONS

Microsoft, "Chapter 8: Microsoft Windows 2000 Security Technical Reference", downloaded on Jun. 26, 2006 from http://www.microsoft.com/mspress/books.sampchap/3873a.asp.

Secure Data Innovations AG,"IDG 9480", downloaded on Jun. 26, 2006 from http://www.securedata innevations.ch/securetapesolutions.htm.

Webopedia, "symmetric-key cryptography", downloaded on Jun. 26, 2006 from http://www.webopedia.com/TERM/S/symmetric_key_cryptography.html.

Bhatia, M., "How to Keep Intruders Away," The Hindu Business Line, downloaded on Jun. 26, 2006 from http:///www.thehindubusinessline.com/mentor/2002/05/13/stories/20020.

Natsume Matsuzaki, et al. "DVD Content Scramble System", National Technical Report, Japan, Matsushita Electric Industrial Co., Ltd. , Jun. 18, 1997, vol. 43, No. 3, p. 118-122.

"Search report about the current conditions of Personal Authentication methods", Japan, Security Center Information-technology Promotion Agency, Online, Mar. 2003, p. 13-18, [Aug. 17, 2012 Search], Internet, U R L , <http://www.ipa.go.jp/security/fy14/reports/authentication/authentication2002.pdf>.

Nobuichi Ikeno, Kenji Koyama, "Modern Cryptography", Japan, The Institute of Electronics, Information and Communication Engineers , Nov. 15, 1997, 6 t h printing of first edition, p. 217-218.

"Search report about the current conditions of Personal Authentication methods", Japan, Security Center Information-technology Promotion Agency, Online, Mar. 2003, p. 13-18, [Aug. 17, 2012 Search], Internet, <http://www.ipa.go.jp/security/fy14/reports/authentication/authentication2002.pdf>.

* cited by examiner

ENCRYPTED TAPE ACCESS CONTROL VIA CHALLENGE-RESPONSE PROTOCOL

BACKGROUND OF THE INVENTION

1. Field of the Invention

This invention pertains to technologies for secure handling and encryption of data in removable media, such as on computer tapes and tape drives.

2. Background of the Invention

More and more data is being written to tapes as encrypted data to protect this information in transit. The data is generally encrypted by a symmetric key, and possession of the key is required to decrypt the tape.

Symmetric encryption, also known as secret-key cryptography, refers to an encryption scheme in which both the encrypting party (or device) and the decrypting party (or device) share a single, common key value. Symmetric encryption tends to be simpler, using only one key or password value, and faster to execute. One commonly used symmetric encryption scheme is Data Encryption Standard ("DES").

For example, if a set of database records are written to a tape in preparation for shipping the tape from one data center to another, the administrator may specify a password for DES encryption routine which would then encrypt the data as it is stored on the tape. The administrator would then securely share the password with the intended recipient administrator at the destination data center.

If during transit the tape were stolen, lost, or duplicated, a person or system attempting to decrypt the data would be unable to do so unless he or she possessed the secret key (e.g. the password), or an encryption busting tool. It is more common that the password would be compromised, but encryption busting tools are also available for weaker encryption schemes.

When the tape arrives at its destination data center, the second administrator would then mount the tape, supply the password to a DES decryption routine, and then as the data is read from the tape, it would be decrypted and stored locally, such as in a database.

As such, existing means of decrypting the tape are based on the encryption key being loaded into the reading tape drive by an external entity, with simply being able to access the tape allows for loading of the key, and for reading of the data. This provides a relatively insecure environment, which is difficult to automate.

Therefore, there is a need in the art for a computer media encryption and decryption method and system which are relatively easy to operate, but which provide data security.

BRIEF DESCRIPTION OF THE DRAWINGS

The following detailed description when taken in conjunction with the figures presented herein provide a complete disclosure of the invention.

SUMMARY OF THE INVENTION

The inventors of the present invention and the related invention have recognized a problem unaddressed in the art in that existing tape encryption and handling methods are easy to use, but also easy to compromise and difficult to automate. The present invention automates the tape loading and decryption process by, when a tape is loaded and before any data reads are performed, a host system desiring to read the data most prove to the tape drive that it possesses certain knowledge about the tape itself. This is performed by the tape drive issuing a "challenge", the host permuting the challenge with the known information, and the tape drive verifying that the permutation is as expected. As such, the tape reading systems, and the data format on the tape, are enhanced to employ stronger forms of encryption, and to employ a "challenge-response" authentication scheme.

DETAILED DESCRIPTION OF THE INVENTION

Figure 6:
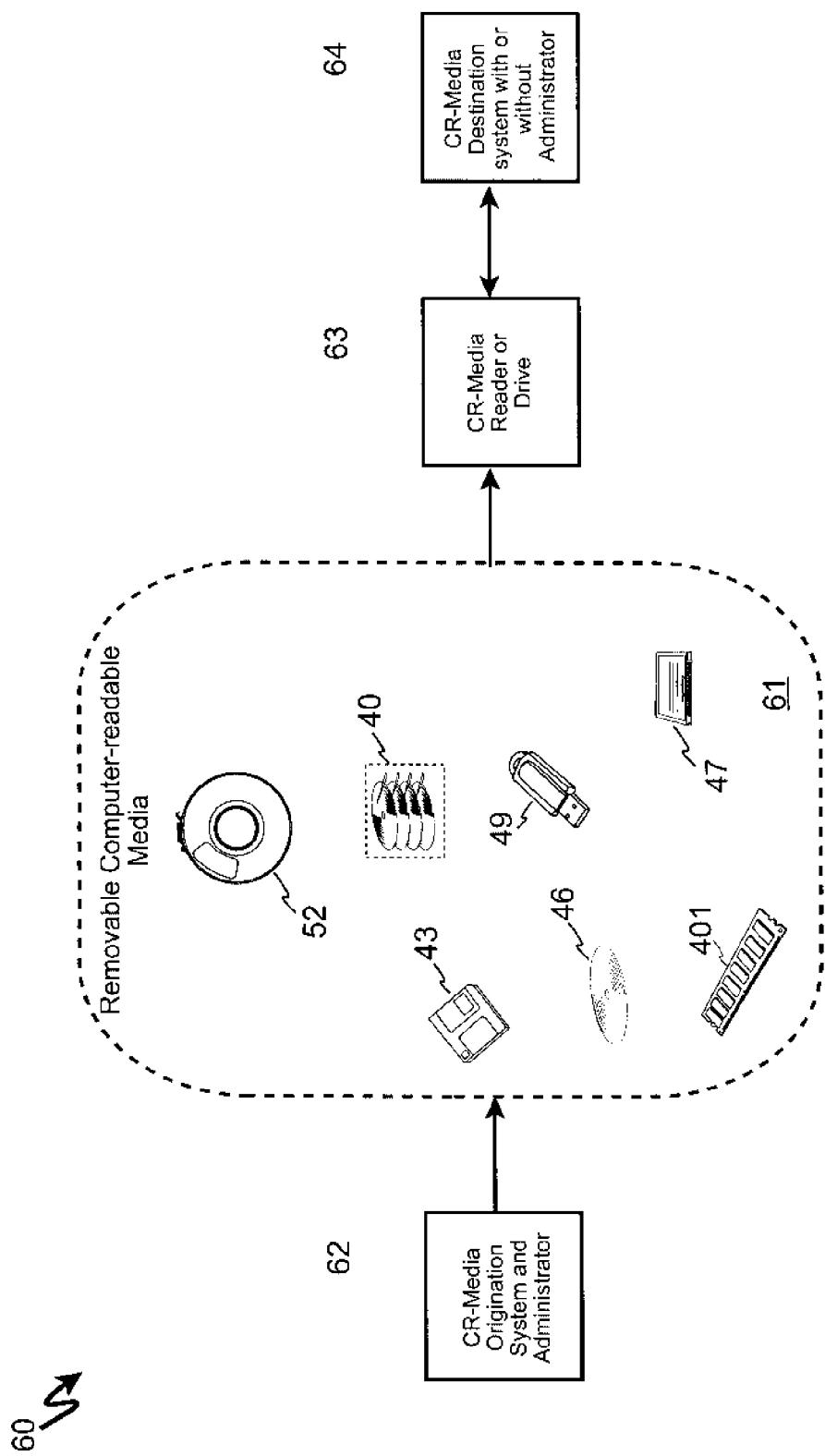
FIG. 6 sets forth an arrangement of systems and components according to the invention.

System Diagram. FIG. 6 sets forth an arrangement (60) of components and systems according to the invention, including a system (62) for creating or originating a removable computer-readable medium (61) with encrypted data stored on or in it. Some commonly used removable media (61) to which the invention may be applied include computer tapes and tape cartridges (52), floppy disks (43), removable hard drives (40), flash or thumb drives (49), compact disks (e.g. CD, CD-ROM, CD-R, CD-RW, etc.) and digital versatile disks (e.g. DVD, DVD-R, DVD-RW, etc.), removable memory modules (401), and various memory cards (e.g. CompactFLASH, Secure Data SD, Sony Memory Sticks™, etc.) (47). The invention is not limited to application to these specific media, but may also be used with other types of removable computer media on which encrypted data is stored or encoded. Throughout the remainder of this disclosure, we will refer to all types of removable media using computer tapes as a representative example.

The media (61) is transported to a compatible reader or drive (63) and interconnected to a destination system (64). According to the present invention, the authentication process of the destination system (64) is fully automated, so no administrator must be present to operate the invention, or if an administrator is present, no administrator interaction is required.

Figure 1:
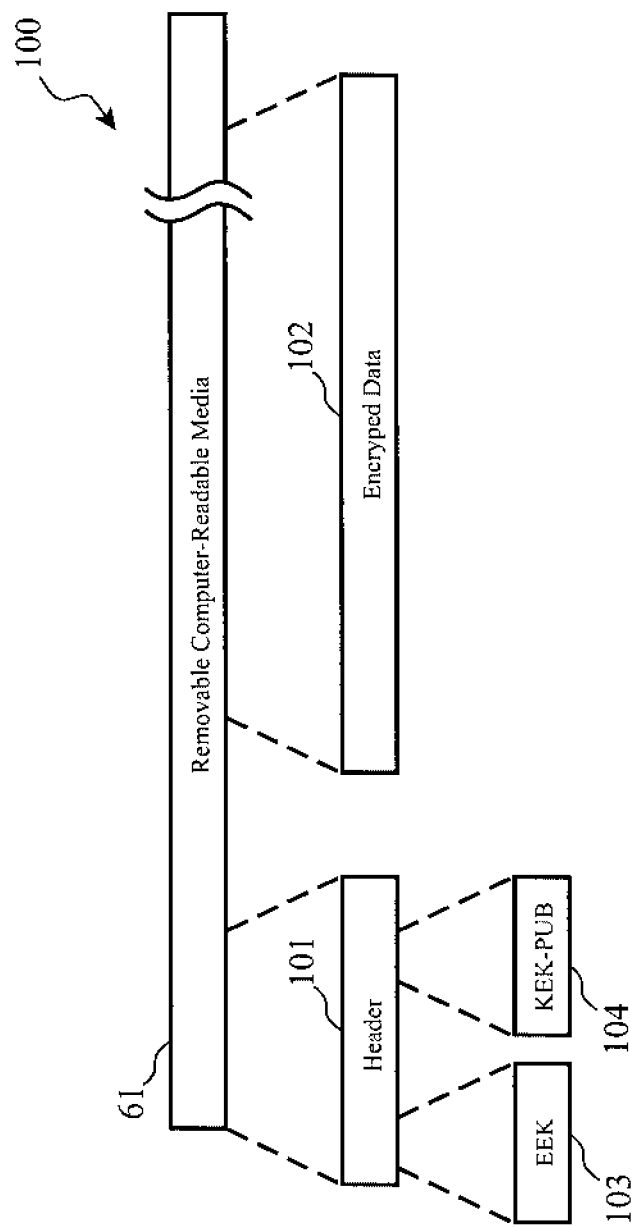
FIG. 1 depicts a data structure according to the present invention.

Data Structures. FIG. 1 illustrates (100) a data structure according to the present invention which is disposed on or in a removable computer-readable medium or multiple media (61). At least one header area (101) is provided, associated with one or more encrypted data areas (102), such as encrypted data blocks or files. Within the header is stored at least one asymmetrically-encrypted symmetrical encryption key EEK (103), and at least one associated public asymmetric encryption key KEK-PUB (104), both of which are associated with at least one encrypted data area (102).

Figure 7A:
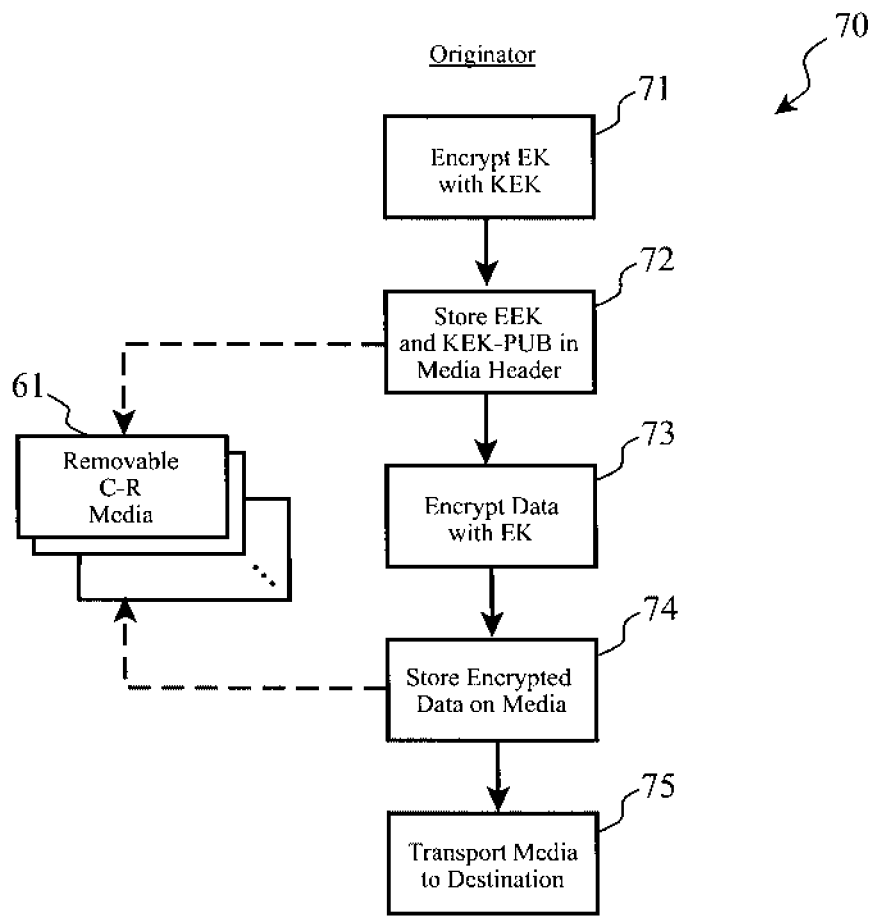
FIGS. 7a and 7b set forth logical processes for creating the data structures and controlling access to the encrypted data on the removable computer media in accordance with the invention.
Figure 7B:
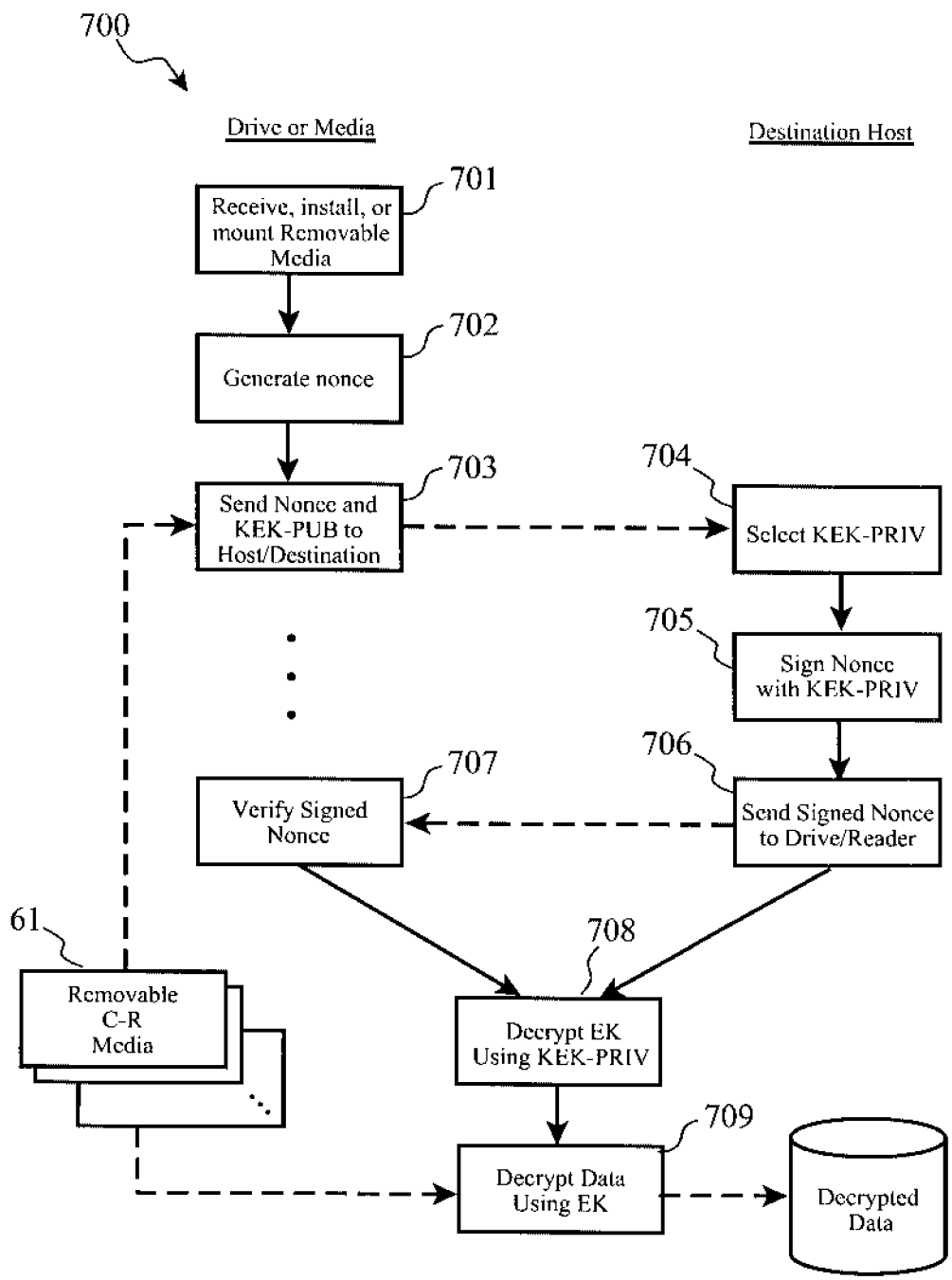

Generalized Logical Process. FIGS. 7a and 7b illustrate generalized logical processes according to the invention. In FIG. 7a, the general process of creating (70) one or more removable computer-readable media (61) is shown in which an administrator-specified symmetric encryption key ("EK") is itself encoded (71) with an asymmetric encryption key (e.g. a Key Encryption Key or KEK) to yield an assymetrically-encrypted symmetrical encryption key ("EEK"). The EEK is stored (72) in the media's (61) header, along with a copy of the public portion of the asymmetrical encryption key ("KEK-PUB").

Next, one or more blocks of data, data files, records, etc., are symmetrically encrypted (73) using the EK, and the encrypted data is stored or encoded (74) on or in the media (61). The media (61) is then removed and transported to the destination system.

FIG. 7b shows a generalized logical process (700) according to the invention for determining if the destination system is authorized to access the data, and allowing it to decrypt the data, without the need for administrators to share a secret key. First, the removable media (61) is received, installed, inserted, mounted, or otherwise disposed (701) in a manner such that a compatible reader or drive can access the data encoded or stored on or in the media.

A random value (e.g. a "nonce") is generated (702) by the drive or reader, which is transmitted (703) to the destination host along with a copy of the public portion of the asymmetric encryption key ("KEK-PUB").

The destination host receives the nonce and KEK-PUB, and uses the KEK-PUB to select (704) a matching private asymmetric encryption key ("KEK-PRIV"). It then uses the KEK-PRIV to sign the nonce, and the signed nonce is returned (706) to the drive or reader.

The drive or reader then verifies that the signed value from the host matches the nonce, and if so, either the reader, the host, or a cooperation of the two, accomplishes decryption (708) of the symmetric encryption key EK using the KEK-PRIV, followed by decryption (709) of the data from the media (61).

Figure 5A:
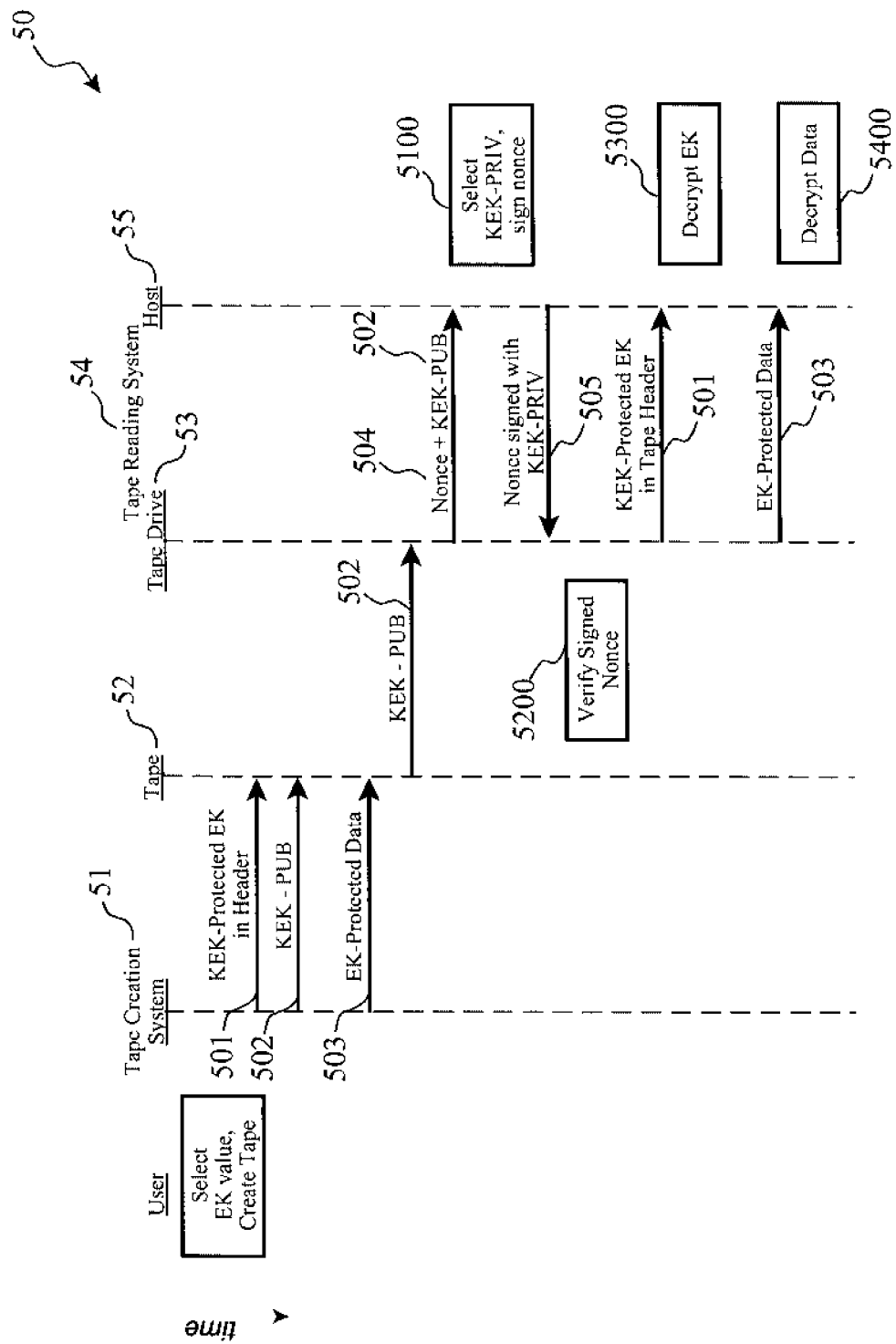
FIGS. 5a and 5b illustrate communications and interactions between systems and components arranged and inter-operating in accordance with the present invention.
Figure 5B:
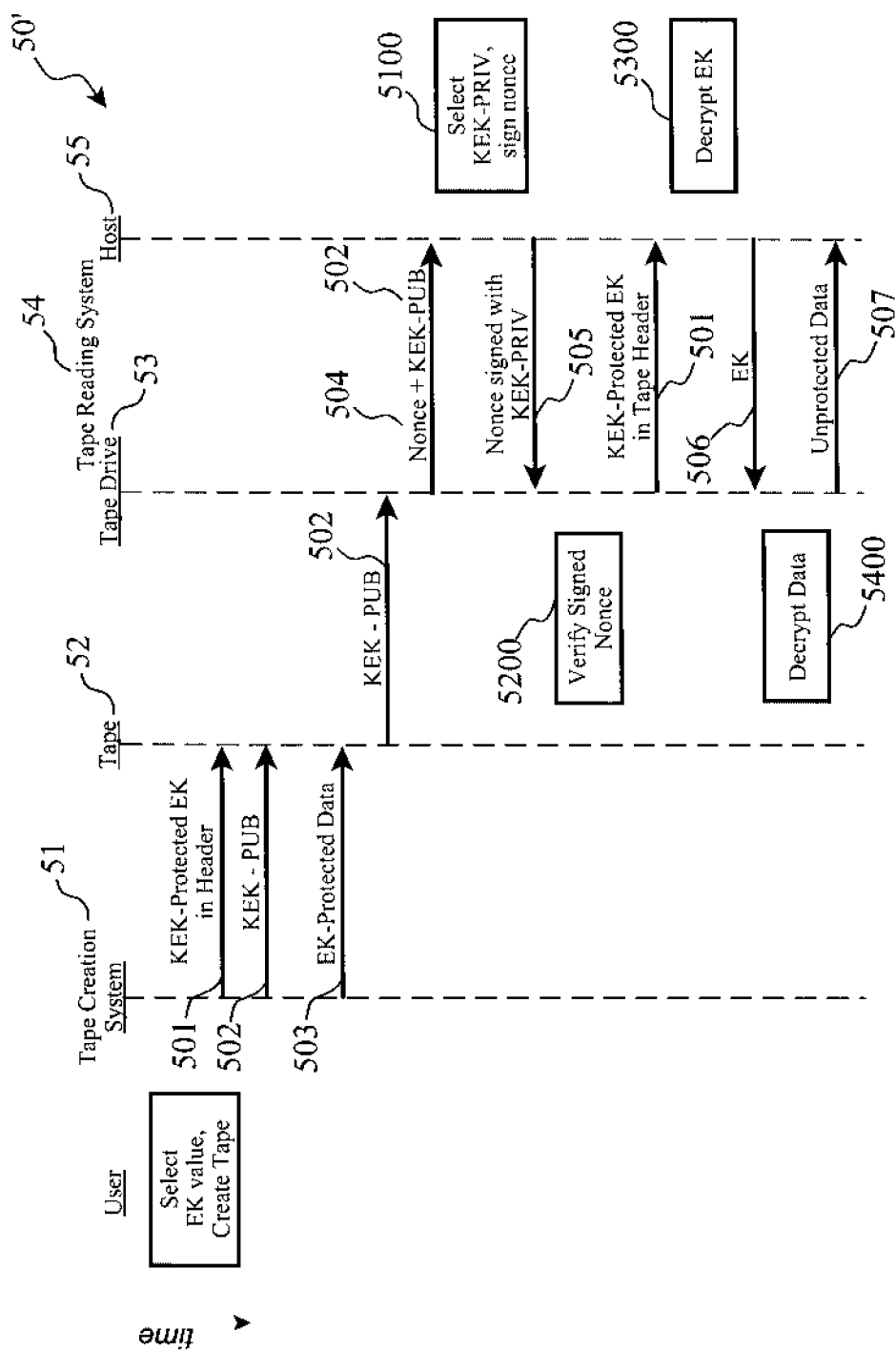

Detailed Example Embodiments. FIGS. 5a and 5b provide example embodiments according to the invention in a more detailed, signal flow format, to illustrate the interactions between the various systems and components arranged according to the invention.

Turning to FIG. 5a, according to a first aspect of the present invention, a symmetric encryption key EK is stored on a computer tap (52) in a header (501) data structure, which itself is encrypted using an asymmetric cryptographic key, which we refer to as a Key Encrypting Key or KEK, by a tape creation system (51). The tape creating administrator or user designates the public portion of the KEK used to "wrap" the EK, resulting in an asymmetrically-encrypted symmetric encryption key EEK being stored on the tape. In addition, the public portion of asymmetric cryptographic key KEK-PUB (502) is disposed on the tape. Then, the data is disposed (503) on the tape after having been encrypted through a symmetric key process using the EK.

According to another aspect of the present invention, when the tape is to be read or loaded into another computer system (54), the tape (52) is inserted into a tape drive (53), and the tape drive's firmware reads the header information from the tape. The tape drive generates a random value of a known length (e.g. a "nonce"), such as a 20-byte nonce, which it retains and also sends to the host system which is attempting to read the tape data (504). The host system is also provided by the tape drive with the public key KEK-PUB (504) to use to respond to the "challenge", and to eventually decode the EK in the header.

The host system receives the nonce and the KEK-PUB (502, 504), uses the KEK-PUB to determine (5100) which private key ("KEK-PRIV") to employ, and then signs the nonce using the selected KEK-PRIV, and returns it (505) to the tape drive (53).

Next, the tape drive (53) uses the KEK-PUB (502), known from the tape header, to verify that the value which was signed by the host is the same as the nonce sent to the host. If so, this successfully completes the challenge (the issuing of the nonce and KEY-PUB to the host) and response (the correct selection of a KEY-PRIV and signing of the nonce by the host) process, which proves that the host is allowed to access the tape data.

Finally, according to another aspect of the invention, the host receives the KEK-protected EK (501) from the tape drive, decrypts (5300) the symmetric EK using the selected and proven KEK-PRIV, followed by decrypting (5400) the tape's encrypted data using the decrypted EK and a matching symmetric decryption process. This example embodiment (50) assumes that the tape drive does not decrypt the tape data for the host, but instead provides the encrypted data to the host and the host decrypts the data.

However, according to another embodiment of the present invention as illustrated by FIG. 5b, this latter portion of the process (50') is adjusted for tape drives which perform the decryption (5400') of the tape data if the host provides the correct symmetric encryption key (506). So, in this variation of the invention embodiments, the host decrypts (5300) the EK using the KEK-PRIV selected (5100) during the challenge-response phase, and then sends that EK (506) to the tape drive (53). The tape drive (53) then decrypts (5400') the tape data, and sends the unprotected or decrypted data (507) to the host.

Suitable Encryption Methods. Any suitable standard or proprietary asymmetric encryption scheme may be employed for protecting the symmetrical encryption key. For example, asymmetric encryption according to the well-known Rivest-Shamir-Adlema ("RSA") schema, the well-known "pretty good privacy" ("PGP"), or alternatively according to the well-known Digital Signature Algorithm ("DSA") can be utilized. For the symmetric encryption scheme, a well-known process such as DES or DESX may be utilized.

Suitable Computing Platform. In one embodiment of the invention the previously described logical processes are performed in part or wholly by software executed by a computer, such as an embedded microcontroller, a personal computer, a web server, a web browser, or even an appropriately capable portable computing platform, such as personal digital assistant ("PDA"), web-enabled wireless telephone, or other type of personal information management ("PIM") device.

Therefore, it is useful to review a generalized architecture of a computing platform which may span the range of implementation, from a high-end web or enterprise server platform, to a personal computer, to a portable PDA or web-enabled wireless phone.

Figure 2A:
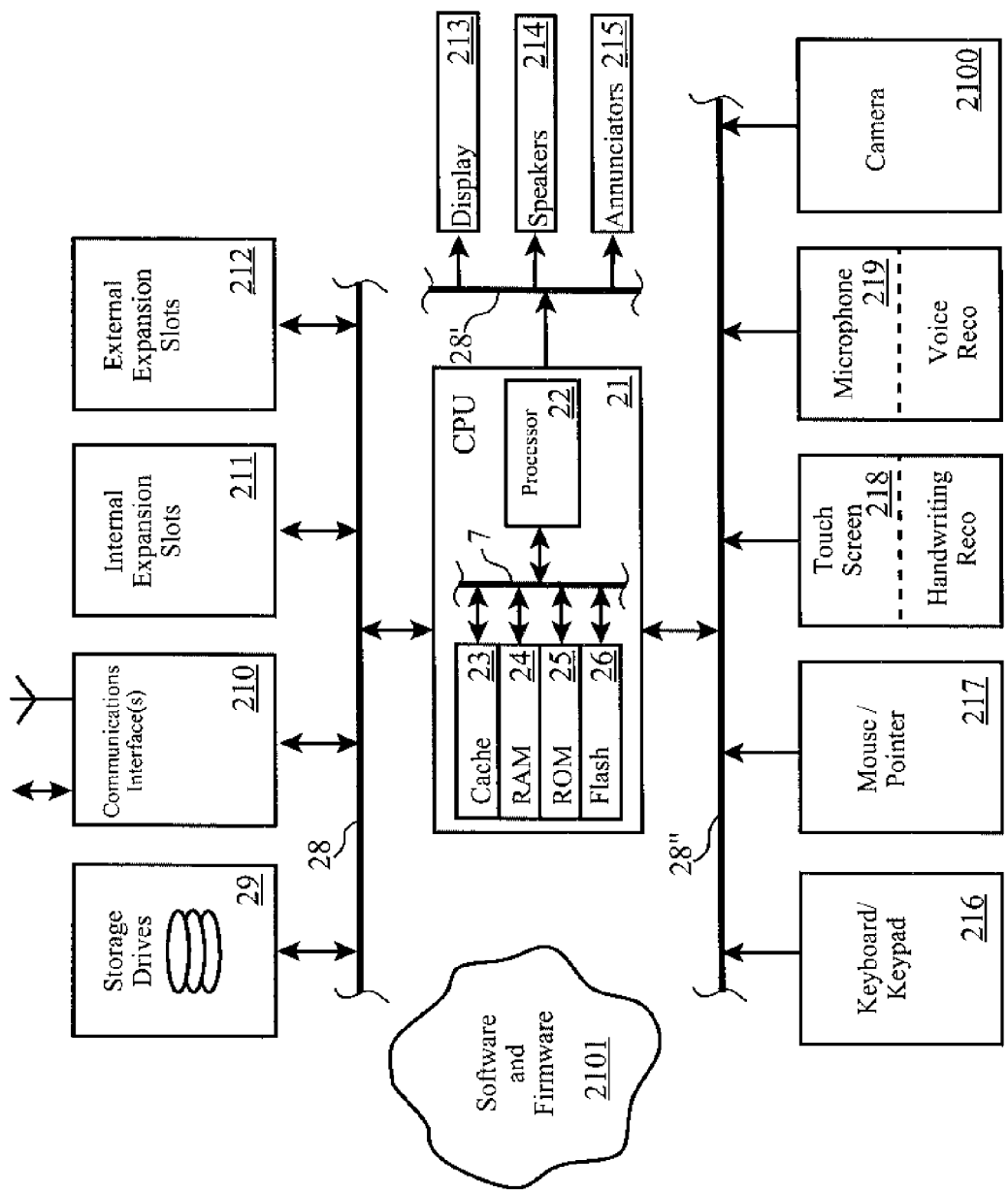
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Tomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc.

The computing platform is also provided with one or more software and firmware (2101) programs to implement the desired functionality of the computing platforms.

Figure 2B:
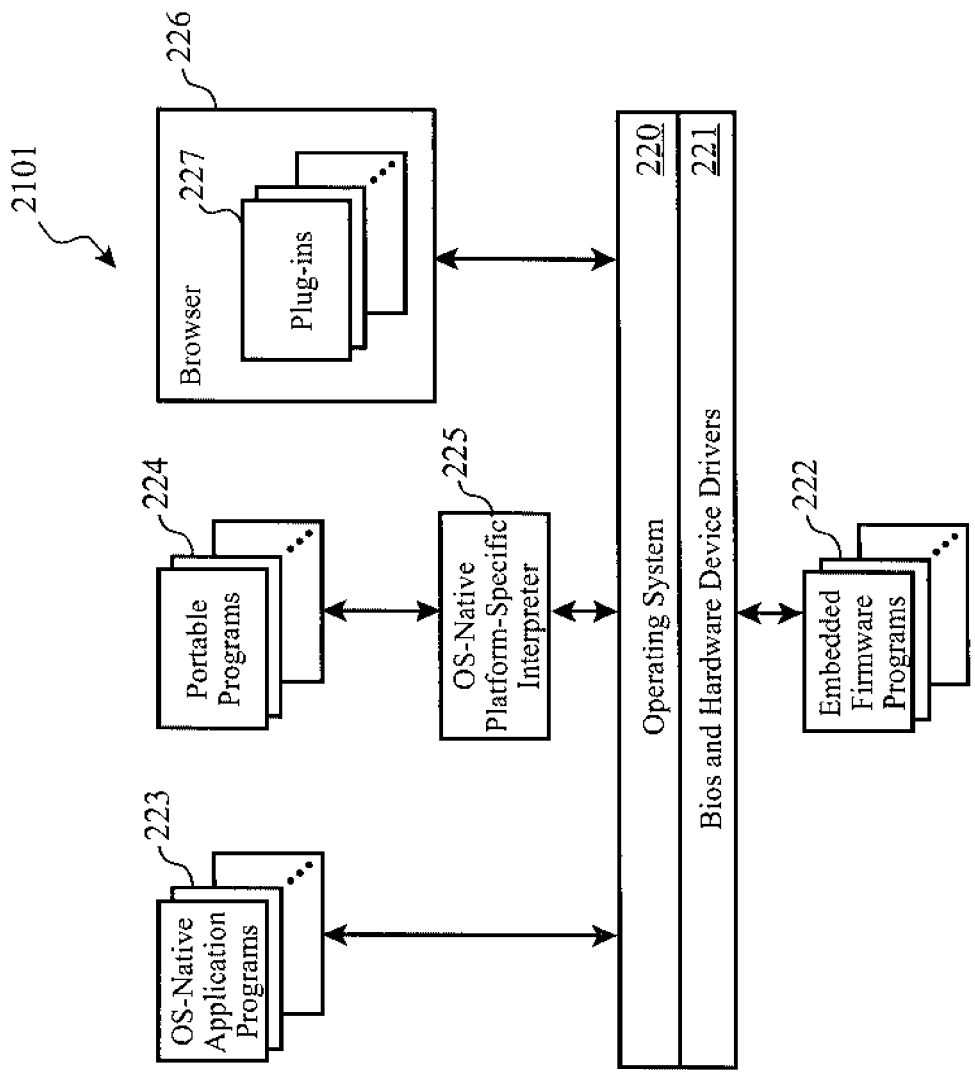

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Service-Based Embodiments

Alternative embodiments of the present invention include some or all of the foregoing logical processes and functions of the invention being provided by configuring software, deploying software, downloading software, distributing software, or remotely serving clients in an on-demand environment, to provide the logical control processes of the advanced washing machine.

Software Deployment Embodiment. According to one embodiment of the invention, the methods and processes of the invention are distributed or deployed as a service by a service provider to a client's computing system(s).

Figure 3A:
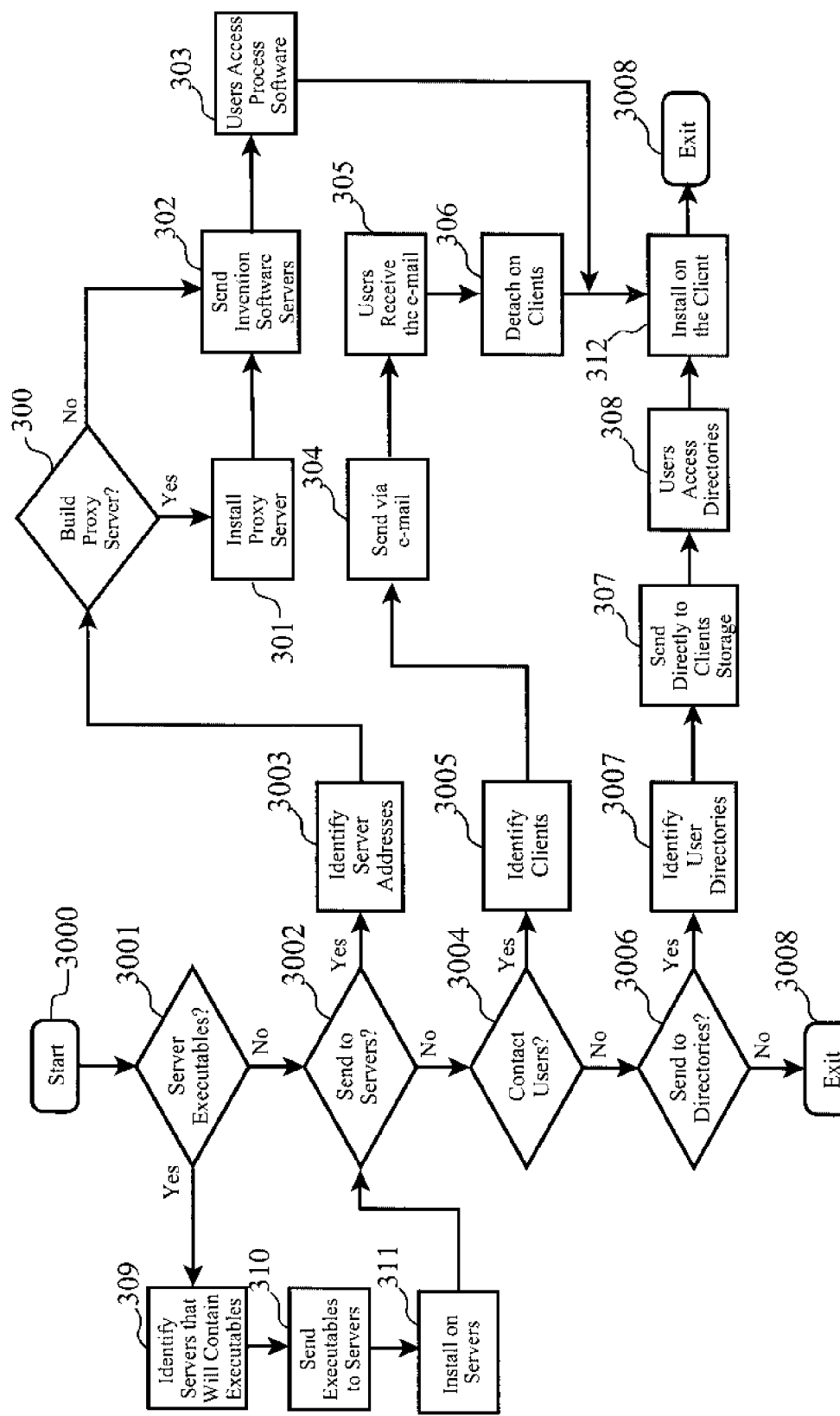
FIG. 3a sets forth a logical process to deploy software to a client in which the deployed software embodies the methods and processes of the present invention.

Turning to FIG. 3a, the deployment process begins (3000) by determining (3001) if there are any programs that will reside on a server or servers when the process software is executed. If this is the case then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as but not limited to sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
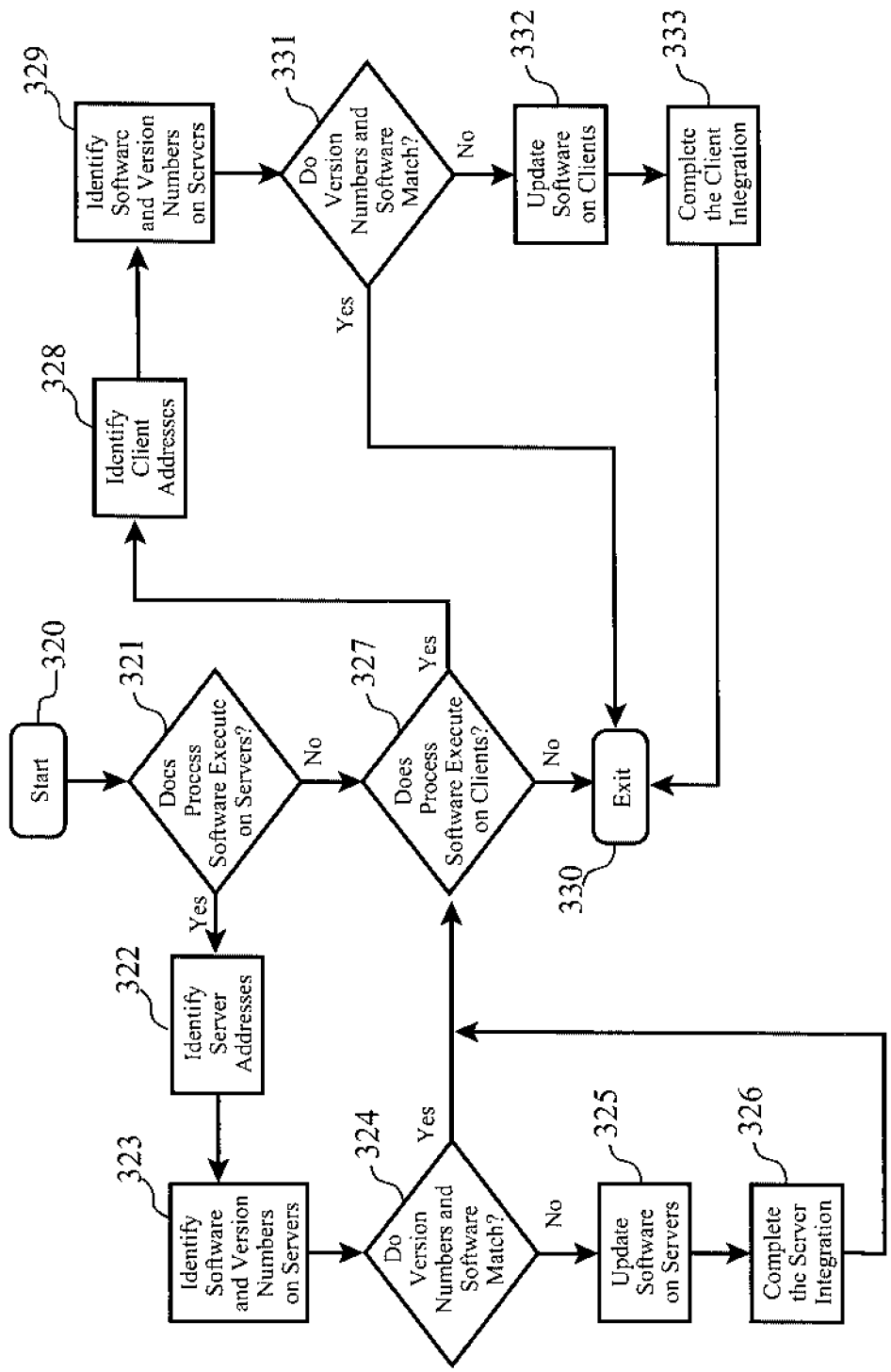
FIG. 3b sets for a logical process to integrate software to other software programs in which the integrated software embodies the methods and processes of the present invention.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match and there is no missing required software the integration continues in (327).

If one or more of the version numbers do not match, then the unmatched versions are updated on the server or servers with the correct versions (325). Additionally if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the unmatched versions are updated on the clients with the correct versions (332). In addition, if there is missing required software then it is updated on the clients (332). The client integration is completed by installing the process software on the clients (333). The integration proceeds to (330) and exits.

On-Demand Computing Services Embodiment. According to another aspect of the present invention, the processes and methods disclosed herein are provided through an on-demand computing architecture to render service to a client by a service provider.

Figure 3C:
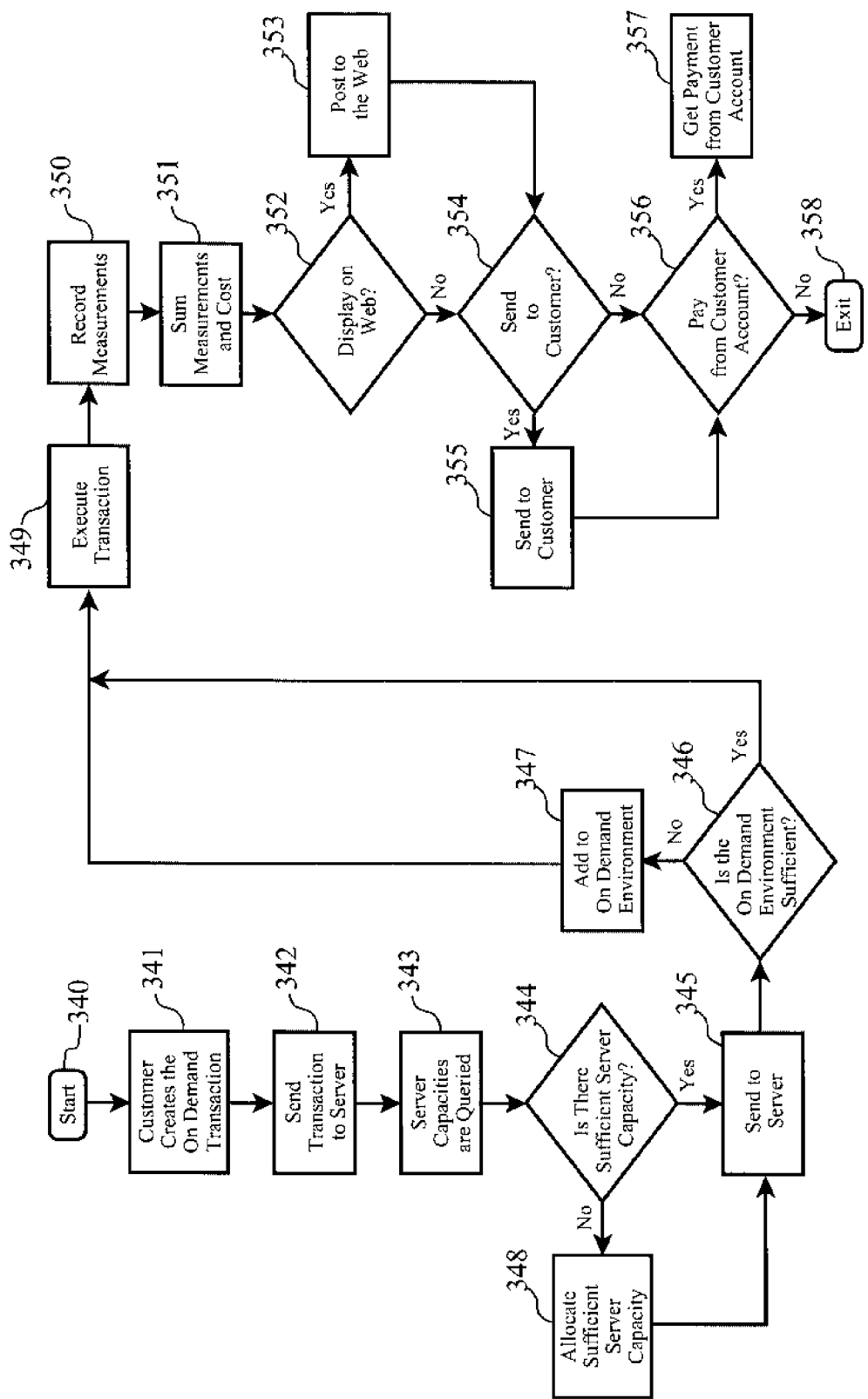
FIG. 3c sets for a logical process to execute software on behalf of a client in an on-demand computing system, in which the executed software embodies the methods and processes of the present invention.

Turning to FIG. 3c, generally speaking, the process software embodying the methods disclosed herein is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload.

Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and are indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On Demand process. A transaction is created that contains the unique customer identification, the requested service type and any service parameters that further specify the type of service (341). The transaction is then sent to the main server (342). In an On Demand environment the main server can initially be the only server, then as capacity is consumed other servers are added to the On Demand environment.

The server central processing unit ("CPU") capacities in the On Demand environment are queried (343). The CPU requirement of the transaction is estimated, then the servers available CPU capacity in the On Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On Demand environment to determine if the environment has sufficient available capacity for processing the transaction. This environment capacity consists of such things as but not limited to network bandwidth, processor memory, storage etc. (345). If there is not sufficient available capacity, then capacity will be added to the On Demand environment (347). Next the required software to process the transaction is accessed, loaded into memory, then the transaction is executed (349).

The usage measurements are recorded (350). The usage measurements consists of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On Demand costs be posted to a web site (352) then they are posted (353). If the customer has requested that the On Demand costs be sent via e-mail to a customer address (354) then they are sent (355). If the customer has requested that the On Demand costs be paid directly from a customer account (356) then payment is received directly from the customer account (357). The last step is to exit the On Demand process.

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is built on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
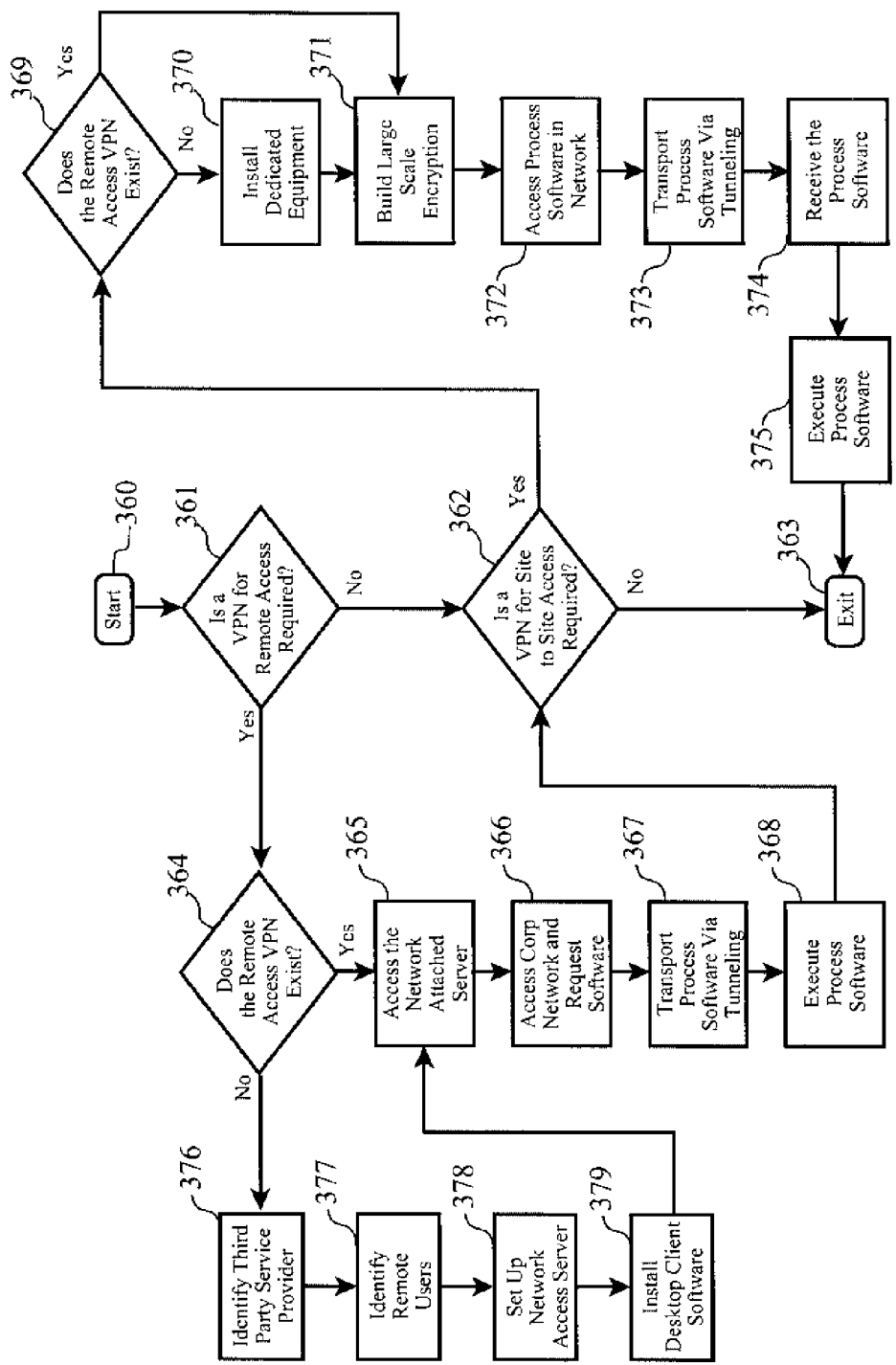
FIG. 3d sets for a logical process to deploy software to a client via a virtual private network, in which the deployed software embodies the methods and processes of the present invention.

Turning to FIG. 3*d*, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Computer-Readable Media Embodiments

In another embodiment of the invention, logical processes according to the invention for and described herein for controlling a washing machine are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
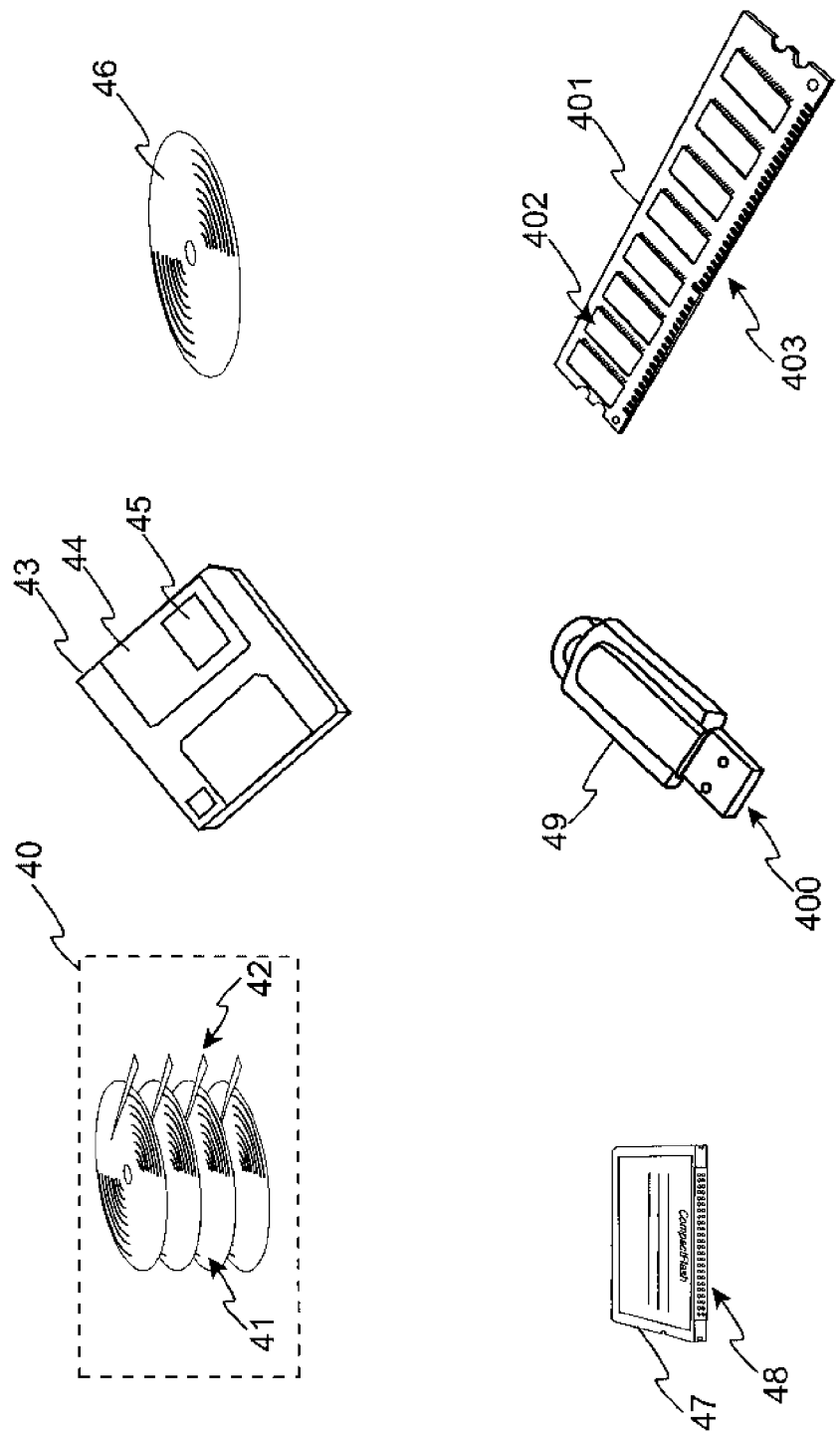
FIGS. 4a, 4b and 4c, illustrate computer readable media of various removable and fixed types, signal transceivers, and parallel-to-serial-to-parallel signal circuits.

FIG. 4*a* illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliablity and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
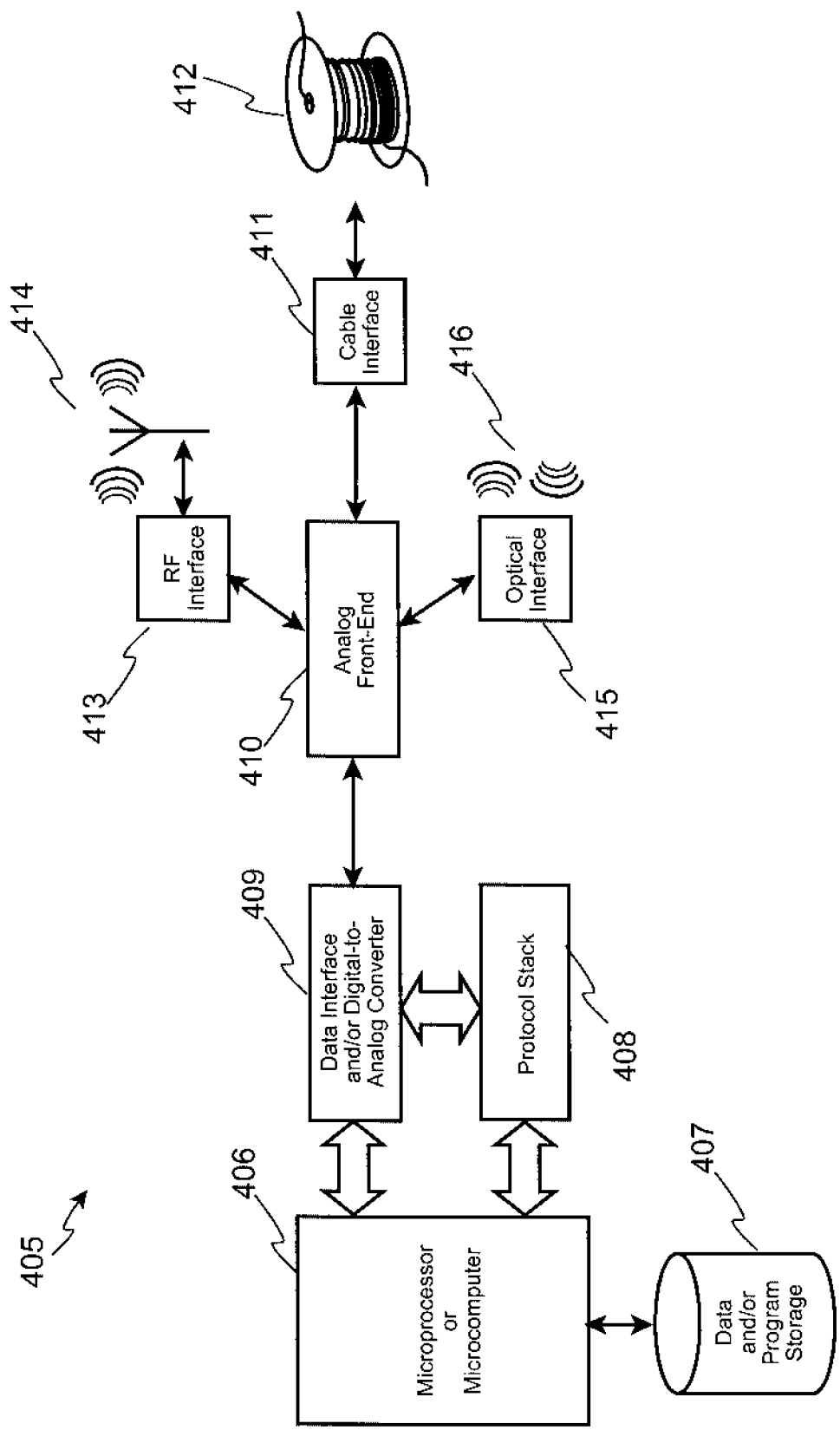

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-periperal embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
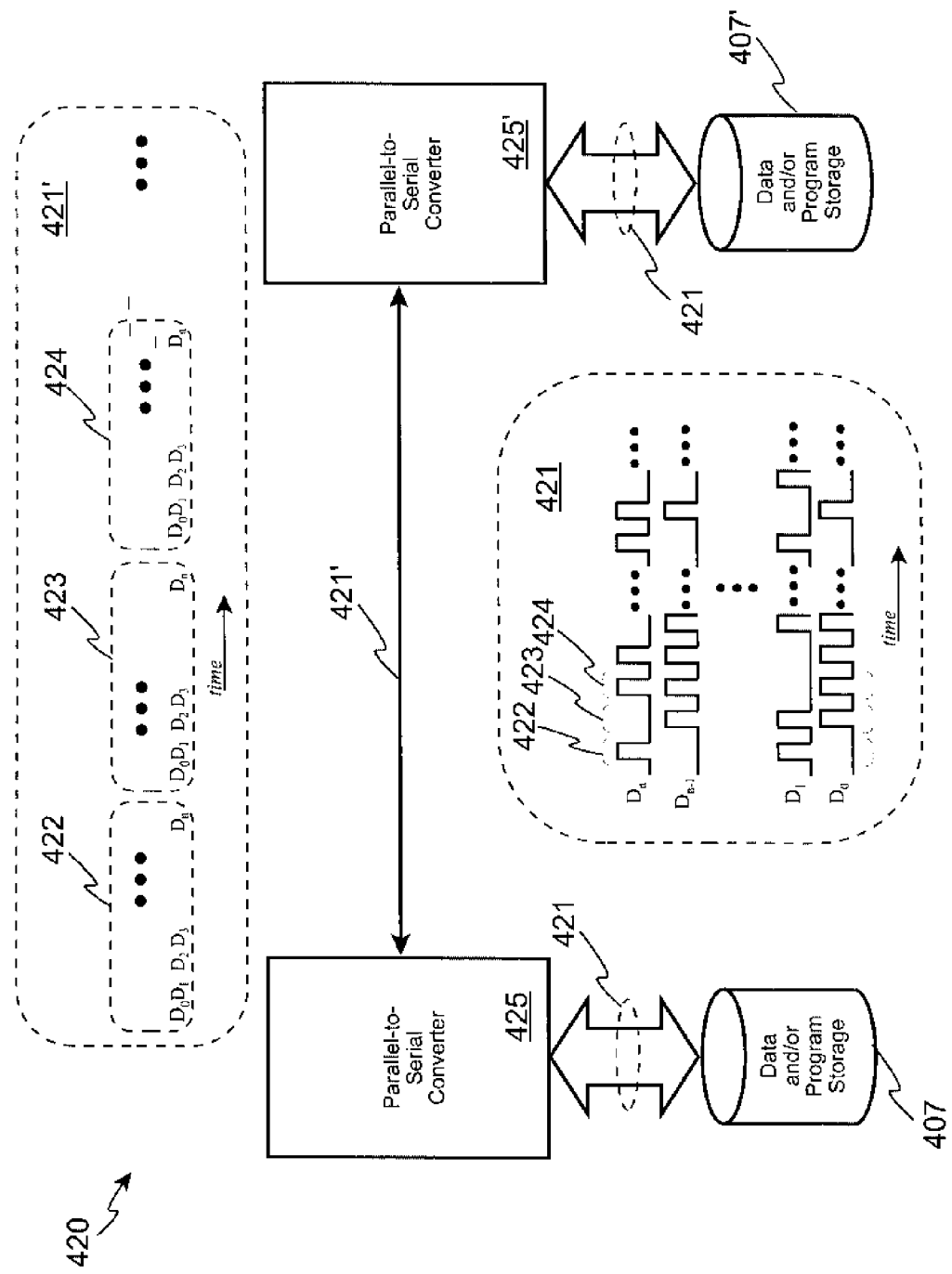

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as an RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as a RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs. ps Conclusion While certain examples and details of various embodiments have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. A system for protecting duplicated data from unauthorized access through compromise of a user password comprising:
   a hardware processor for performing a logical process;
   a first, a second and a third computer readable storage memory hardware device suitable for encoding computer executable programs and data structures,
   wherein the second and third computer readable storage memory hardware devices are removable;
   a data structure in the second computer-readable tangible storage memory hardware device consisting of:
      header area comprising a symmetrical key wrapped by asymmetrical encryption, and a public key associated with the asymmetrical encryption, and
      an encrypted data area in which protected data is encrypted according to the symmetrical key; and
   instructions encoded by the first computer readable storage memory hardware device for causing a storage device reader processor to:
      receive the second computer-readable tangible storage device;
      responsive to the receiving, issue a challenge containing the public key to an automated host computer external to the storage device reader, responsive to the issuing, receiving a response from the external automated host computer signed by a private key associated with the public key, and verifying the received signed response; and
      responsive to the verifying failing, allowing duplication of the data structure from the second computer-readable tangible storage memory hardware device onto the third computer-readable tangible storage memory hardware device while preventing unwrapping of the symmetrical key using the private key, and while preventing decrypting of the encrypted data area using the unwrapped symmetrical key thereby enabling secure copying and but not decryption of the protected data while maintaining unchanged both the symmetrical key and the associated public asymmetric encryption key in the header of the data structure stored by the second and the third computer-readable tangible storage devices.

2. The system as set forth in claim 1 wherein the challenge comprises a nonce generated by the tape reader.

3. The system as set forth in claim 1 wherein the data decrypter is disposed in the automated host computer.

4. The system as set forth in claim 1 wherein the data decrypter is disposed in the tape reader.

5. The system as set forth in claim 1 wherein the tangible storage device comprises a computer tape drive.

6. An automated method for protecting duplicated data from unauthorized access through compromise of a user password comprising:
   disposing a data structure in a first removable computer-readable tangible hardware storage device consisting of:
      header area comprising a symmetrical key wrapped by asymmetrical encryption, and a public key associated with the asymmetrical encryption, and
      an encrypted data area in which protected data is encrypted according to the symmetrical key;
   receiving by a storage device reader the computer-readable tangible hardware storage device;
   responsive to the receiving, issuing by the a storage device reader a challenge containing the public key to an automated host computer external to the hardware storage device reader, responsive to the issuing, receiving a response from the external automated host computer signed by a private key associated with the public key, and verifying the received signed response; and
   responsive to the verifying failing, allowing by a protected data access controller duplication of the data structure from the first removable computer-readable tangible hardware storage device onto a second removable computer-readable tangible storage device while preventing unwrapping of the symmetrical key using the private key, and preventing decrypting of the encrypted data area using the unwrapped symmetrical key thereby enabling secure copying and but not decryption of the protected data while maintaining unchanged both the symmetrical key and the associated public asymmetric encryption key in the header of the data structure stored by the second computer-readable tangible storage device.

7. The method as set forth in claim 6 wherein the challenge comprises a nonce generated by a tape reader, and wherein the computer-readable tangible hardware storage device is a data storage tape.

8. The method as set forth in claim 6 wherein the data decryption is performed by the automated host computer.

9. The method as set forth in claim 6 wherein the data decryption is performed by a tape reader.

10. A computer program product for protecting duplicated data from unauthorized access through compromise of a user password comprising:
    a first, a second and a third computer readable storage memory hardware device suitable for encoding computer executable programs and data structures, wherein the second and third computer readable storage memory hardware devices are removable;
    a data structure in the second computer-readable tangible storage hardware device consisting of:
       header area comprising a symmetrical key wrapped by asymmetrical encryption, and a public key associated with the asymmetrical encryption, and
       an encrypted data area in which protected data is encrypted according to the symmetrical key; and
    instructions encoded by the first computer readable storage memory hardware device for causing a storage device reader processor to:
       receive the second computer-readable tangible storage device;
       responsive to the receiving, issue a challenge containing the public key to an automated host computer external to the storage device reader, responsive to the issuing, receiving a response from the external automated host computer signed by a private key associated with the public key, and verifying the received signed response; and
       responsive to the verifying failing, allowing duplication of the data structure from the second computer-readable tangible storage memory hardware device onto the third computer-readable tangible storage memory hardware device while preventing unwrapping of the symmetrical key using the private key, and while preventing decrypting of the encrypted data area using the unwrapped symmetrical key thereby enabling secure copying and but not decryption of the protected data while maintaining unchanged both the symmetrical key and the associated public asymmetric encryption key in the header of the data structure stored by the second and the third computer-readable tangible storage devices.

11. The computer program product as set forth in claim 10 wherein the challenge comprises a nonce.

12. The computer program product as set forth in claim 10 wherein the data decryption is performed by a tape reader.

* * * * *